(12) United States Patent
Shinbutsu et al.

(10) Patent No.: US 12,044,265 B2
(45) Date of Patent: Jul. 23, 2024

(54) FASTENING STRUCTURE WITH DOUBLE NUTS HAVING DUAL-THREADED SCREW

(71) Applicant: FORM ROLL TECH CO., LTD., Yamanashi (JP)

(72) Inventors: Toshinaka Shinbutsu, Yamanashi (JP); Shuichi Amano, Yamanashi (JP)

(73) Assignee: FORM ROLL TECH CO., LTD., Yamanashi (JP)

( * ) Notice: Subject to any disclaimer, the term of this patent is extended or adjusted under 35 U.S.C. 154(b) by 190 days.

(21) Appl. No.: 17/900,872

(22) Filed: Sep. 1, 2022

(65) Prior Publication Data

US 2023/0062368 A1    Mar. 2, 2023

(30) Foreign Application Priority Data

Sep. 1, 2021   (JP) .................................. 2021-142478

(51) Int. Cl.
  *F16B 33/02*   (2006.01)
  *F16B 39/30*   (2006.01)

(52) U.S. Cl.
  CPC .............. *F16B 33/02* (2013.01); *F16B 39/30* (2013.01)

(58) Field of Classification Search
  CPC ...... F16B 5/0275; F16B 5/0283; F16B 25/00; F16B 25/0057; F16B 25/0068; F16B 25/0073; F16B 33/02; F16B 39/30; F16B 43/00
  USPC .......................... 411/337, 411–413, 383, 531
  See application file for complete search history.

(56) References Cited

U.S. PATENT DOCUMENTS

| | | | | |
|---|---|---|---|---|
| 909,033 A | * | 1/1909 | Smith | F16B 39/12 411/222 |
| 1,798,604 A | * | 3/1931 | Hoke | F16B 39/30 411/929 |
| 1,905,869 A | * | 4/1933 | Hoke | F16B 39/30 411/929 |
| 3,072,423 A | * | 1/1963 | Charlton | F16B 5/02 411/398 |

(Continued)

FOREIGN PATENT DOCUMENTS

| | | |
|---|---|---|
| JP | S61180462 | 11/1986 |
| WO | 2016194842 | 12/2016 |
| WO | 2019230167 | 12/2019 |

OTHER PUBLICATIONS

Masatake Kimura et al., "Self-loosening Behaviour of A Spring Washer: Three-dimensional Finite Element Method Study," Transactions of the Japan Society of Mechanical Engineers Series A, Oct. 2007, pp. 1-6.

(Continued)

*Primary Examiner* — Roberta S Delisle
(74) *Attorney, Agent, or Firm* — JCIPRNET

(57) ABSTRACT

Fastening art with double nuts for a dual-threaded screw structure is provided, in which loosening is not created even if the structure is subjected to vibration. A spring washer is caused to intervene between the nuts, when double nuts of an inner nut and an outer nut are screwed onto a thread portion on which dual-threaded screw is formed. Only by tightening the outer nut, also the inner nut is tightened and the spring washer is compressed. Both axial force for clamping the fastened member and axial force between the nuts can be secured with the spring washer, so that loosening does not occur easily.

5 Claims, 5 Drawing Sheets

(56) References Cited

U.S. PATENT DOCUMENTS

| | | | | |
|---|---|---|---|---|
| 4,364,136 | A * | 12/1982 | Hattan | F16B 39/30 |
| | | | | 411/223 |
| 5,885,041 | A * | 3/1999 | Giannuzzi | F16B 25/0047 |
| | | | | 411/258 |
| 6,918,727 | B2 * | 7/2005 | Huang | F16B 25/0047 |
| | | | | 411/389 |
| 8,496,421 | B1 * | 7/2013 | Burton | F16B 39/124 |
| | | | | 411/257 |
| 2007/0036634 | A1 * | 2/2007 | Lung | F16B 39/30 |
| | | | | 411/412 |
| 2013/0152294 | A1 * | 6/2013 | Topcu | F16B 5/0233 |
| | | | | 4/417 |
| 2014/0144003 | A1 * | 5/2014 | Davies | F16B 39/22 |
| | | | | 411/222 |

OTHER PUBLICATIONS

Nissei Co., Ltd., "PLB v2," accessed on Aug. 25, 2022, with English translation thereof, available at: https://www.nisseiweb.co.jp/products.php?page=plbv2, Grace Period Disclosure.

You Tube, "PLB v2 Vibration comparison," published on Sep. 3, 2020, with English translation thereof, available at: https://www.youtube.com/watch?v=h77zfgWe7hg, Grace Period Disclosure.

* cited by examiner

FASTENING STRUCTURE WITH DOUBLE NUTS HAVING DUAL-THREADED SCREW

CROSS-REFERENCE TO RELATED APPLICATION

This application claims the priority benefit of Japan application serial no. 2021-142478, filed on Sep. 1, 2021. The entirety of the above-mentioned patent application is hereby incorporated by reference herein and made a part of this specification.

TECHNICAL FIELD

The present disclosure relates to a fastening structure with double nuts having dual-threaded screw. More particularly, the present disclosure relates to a fastening structure with double-nuts having dual-threaded screw for fastening with double nuts in an optimum manner for a dual-threaded screw.

BACKGROUND ART

Inventors et al. of the present disclosure proposed dual threaded screw structures that cannot be easily loosened by fastening with double nuts (Patent Document 1, Patent Document 2). A dual threaded screw structure has, for example, a first thread (S1) as a metric coarse thread and a second thread (S2) formed on the first thread (S1) to be in the same twisting direction, the second thread (S2) being a thread in which the number of threads is less by one thread or more than a multi-threaded thread having a lead of a plural times of the pitch of the first thread (S1). This dual-threaded screw structure is used usually as a fastening structure by tightening with two nuts of a metric coarse thread nut screwed onto the first thread (S1) and a high lead nut (a nut for a multi-threaded thread) screwed onto the second thread (S2). There is a merit in fastening with this such that only tightening with the metric coarse thread nut is necessary for it and fastening operation such as tightening back as required for fastening with double nuts is not necessary.

On the other hand, it has been proposed to cause a spring washer to intervene between nuts for fastening with double nuts in an ordinary screw body in order to prevent nuts from loosening (Patent Document 3). Further, for fastening with a bolt and nut using an ordinary spring washer, a report of study has been conducted regarding ability of preventing rotation (ability of preventing loosening) of the spring washer through analysis using finite element method, while it is not of fastening with double nuts (Non-patent Document 1). In this, it is reported that axial force is lowered to a remarkable extent in a case of using a spring washer. In other words, it is reported that a nut is loosened even under intervention of a spring washer by providing the fastened body with vibrational load accompanied by excitation force in a direction perpendicular to the axial line of the bolt.

PRIOR ART DOCUMENTS

Patent Documents

[Patent Document 1] WO2016/194842
[Patent Document 2] WO2019/230167
[Patent Document 3] JP: Published Utility Model Application S61-180462

Non-Patent Documents

[Non-Patent Document 1]
Masatake Kimura et al. "Self-loosening Behavior of a Spring Washer: Three-dimensional Finite Element Method Study" (https://www.fml.t.u-tokyo.ac.jp/~izumi/papers/Spring_washer070326.pdf)

SUMMARY OF THE INVENTION

Problems to be Solved by the Invention

While there is no problem in fastening with double nuts using a dual-threaded screw structure proposed by the present inventor, etc., when it is applied in an ordinary structure or the like, there may be an occasion of loosening of double nuts when it is applied in a railway bridge or the like that is subjected to severe vibration at all times. Though such loosening can be prevented through periodic inspections, etc., it should be avoided as long as possible. While fastening proposed in Patent Document 3 provides restraining occurrence of loosening in fixing terminals in wiring of an electric apparatus with standardized screws, it is not such one as to have an object to prevent loosening in strong fastening with double nuts that can be used in large scale structures, etc. Prevention of loosening with a spring washer reported in Non-patent Document 1 is not one as used in fastening with double nuts but one that uses ordinary screws such as metric coarse screws as a prerequisite matter.

Under such background, the present disclosure solves problems as follows.

The present disclosure provides a fastening structure with double nuts having a dual-threaded screw in which there occurs no loosening even having been subjected to external force such as vibration only by tightening an outer nut in fastening with double nuts in a dual-threaded screw structure.

The present disclosure provides a fastening structure with double nuts having a dual-threaded screw in which clamping force (axial force) between both nuts can be held without lowering clamping force of a fastened body only by tightening an outer nut in fastening with double nuts in a dual-threaded screw structure.

Means for Solving the Problems

The fastening structure with double nuts having dual-threaded screw of the present disclosure 1 comprises:
- a dual-threaded screw structure having two kinds of threads formed on a shank thereof, said two kinds of threads including: a first one-threaded thread selected from metric thread, Whitworth thread, unified thread, trapezoidal thread, pipe thread, round thread, ball thread and square thread, and a second one-threaded or multi-threaded thread formed in a same twisting direction as the first one-thread and having a lead (Ln) larger than a pitch (P) of the first one-thread;
- a first nut screwed onto the first one-thread; and
- a second nut screwed onto the second one-thread on a side of a fastened member and at an inside position of the first nut;
- wherein a spring-shaped washer being elastically deformable is provided between the first nut and the second nut to be fitted into the dual-threaded screw structure.

The fastening structure with double nuts having dual-threaded screw of the present disclosure 2 is one such that, in the present disclosure 1, the spring-shaped washer is a spring washer.

The fastening structure with double nuts having dual-threaded screw of the present disclosure 3 is one such that, in the present disclosure 1, the spring-shaped washer is a dish spring washer.

The fastening structure with double nuts having dual-threaded screw of the present disclosure 4 is one such that, in the present disclosure 1, the lead (Ln) of the second one-thread (S2) is an integer number n times of the pitch (P) of the first one-thread (S1).

The fastening structure with double nuts having dual-threaded screw of the present disclosure 5 is one such that, in the present disclosure 1, an axial force on the side of the fastened member increases at an early stage of vibrational load, so that the fastening structure becomes not to be easily loosened.

Advantageous Effect

With the fastening structure with double nuts having dual-threaded screw according to the present disclosure, both of axial force on a fastened body side and axial force between nuts can be secured only by tightening an outer nut even under vibrational load, so that loosening does not occur easily.

BRIEF EXPLANATION OF DRAWINGS

FIG. 3A and FIG. 3B show change of axial force over time measured in a fastening structure with double nuts having dual threaded screw when a spring washer is sandwiched between nuts, in which FIG. 3A shows change of axial force over time of a shank between nuts and FIG. 3B shows change of axial force over time of a shank in a fastened part.

FIG. 4A and FIG. 4B show change of axial force over time measured in a fastening structure with double nuts having dual threaded screw when a dish spring washer is sandwiched between nuts, in which FIG. 4A shows change of axial force between nuts and FIG. 4B shows change of axial force over time in fastened part.

FIG. 5A and FIG. 5B show change of axial force over time, for a conventional fastening structure with double nuts having dual-threaded screw without a spring washer, etc., between nuts as Comparative example, in which FIG. 5A shows change of axial force between nuts over time and FIG. 5B shows change of axial force over time of a fastened part.

DETAILED EXPLANATION OF EMBODIMENTS

Figure 1:
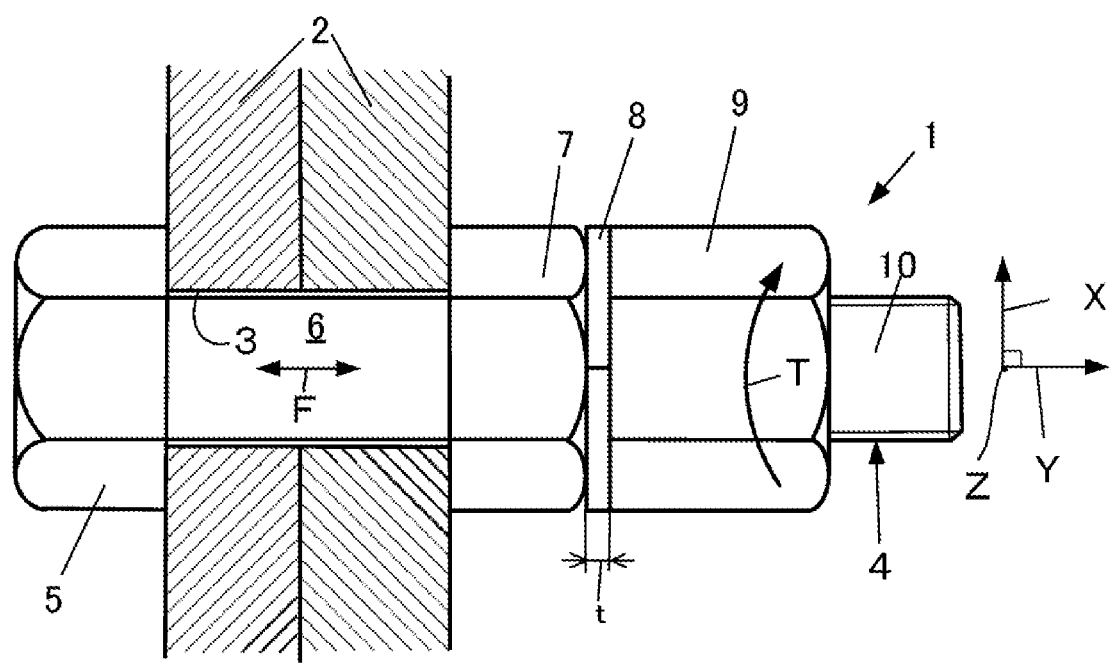
FIG. 1 is a view showing an example of a fastening structure with which a fastened body is fixed with bolt and nut.

A first embodiment of the present disclosure will be explained below referring drawings. FIG. 1 is a view showing an example of a fastening structure in which a fastened body is fixed with bolt and nut. This fastening structure 1 is double nuts including two nuts, between which a spring washer 8 intervenes. In splice portions, etc., of a steel bridge, a through-hole 3 is formed in each of two overlapped fastened members 2. A body portion 6 of a bolt 4 is inserted through this thorough-holes 3. The fastened members 2 are sandwiched between a head 5 of the bolt 4 and an inner nut 7, a spring washer 8 is inserted on the outer side of the inner nut 7, and further an outer nut 9 is screwed onto the bolt 4 on the outer side thereof to be fixed. The bolt 4 is a special screw with a dual-threaded thread formed thereon in this example. Two kinds of threads of a first thread and a second thread are formed to be overlapped in the thread portion 10 of the bolt 4.

In this example, the first thread is a one-threaded thread of metric coarse thread defined in Industrial Standard. The second thread is formed in the same twisting direction as the first thread so as to remove the metric coarse thread. This is a two-threaded thread with a changed phase having a lead (Ln) three-times of a pitch (P) of the metric coarse thread (a thread in which two threads extracted from three threads by one thread are formed at an equiangular distance). As details of the dual-threaded screw is explained in Patent Documents 1 and 2, being of a known technique, and is not a gist of the present disclosure, detailed explanation thereof is omitted here. With the fastening structure 1 of this example, the bolt 4 is inserted through the through-hole 3 of the fastened member 2, the inner nut 7 is screwed manually onto the thread portion 10 of the bolt 4, the spring washer 8 is placed onto the thread portion in the next, and then the outer nut 9 is screwed onto the thread portion 10.

With this fastening structure 1, fastening is conducted by causing only the outer nut 9 to rotate in a decided torque with a wrench (not shown). This means that operation of tightening and tightening back for the inner nut 7, as required for a common fastening operation with double nuts, is not necessary. When the outer nut 9 is screwed onto the thread portion 10 with a torque T, axial force F is created on the body portion 6 of the bolt 4. With the fastening structure 1 as shown in FIG. 1, the fastened member 2 is fastened by causing the outer nut to rotate and other operation for fastening is not conducted. Consequently, it is necessary for the outer nut 9 not to be loosened (with no rotation) by an external force such as vibration after it has been tightened with a decided torque.

For this, it is necessary to hold the axial force of the bolt 4 for fastening the fastened members 2 to be constant and also to secure the axial force between the inner nut 7 as a member for preventing loosening and the outer nut 9 in order to prevent the outer nut 9 from loosening after the outer nut 9 is caused to rotate with a decided torque T. In common fastening with double nuts, it can be said that operation of tightening back of the inner nut 7 is operation for holding axial force between the double nuts. That is, it is necessary for an ideal fastening structure 1 to hold two axial forces, that is, axial force F of bolt for fastening the fastened members 2 and axial force between the outer nut 9 and the inner nut 7 to be suitable only by tightening the outer nut 9 with a decided torque.

With this, an optimum fastening structure is provided that has fastening ability as a fastening structure 1 and yet does not generate loosening of a screw. As axial force F of the shank when the outer nut 9 is tightened with a torque T is decided uniquely once coefficient of friction of bearing face of the outer nut 9 and thread face is decided, it cannot be adjusted unless the coefficient of friction is changed with lubricant, etc. Here, while it is possible to raise axial force between the outer nut 9 and the inner nut 7 by tightening back in a conventional fastening structure with conventional double nuts without a spring washer, axial force F of the shank when tightening back is conducted is lowered. In a case of a common fastening structure with double nuts, it is necessary to tighten back the inner nut 7 after torque for tightening the inner nut 7 and the outer nut 9 once has been raised over the torque in design, in order to secure this axial force F.

Figure 2:
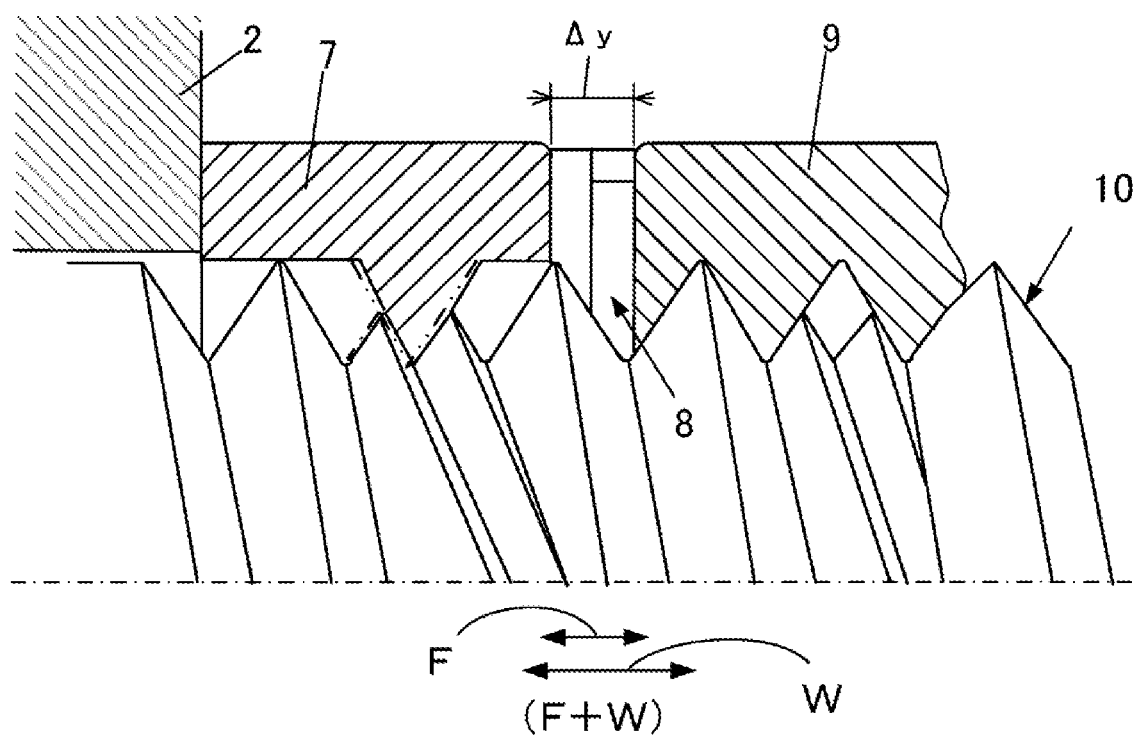
FIG. 2 is an enlarged sectional view of a part of double nuts shown in FIG. 1.

FIG. 2 is a partial enlarged view of the fastening structure 1 shown in FIG. 1 in a state not tightened with the outer nut 9. After tightening has been begun with the outer nut 9, the outer nut 9 contacts with the spring washer 8. At this time, the spring washer 8 is in a state holding a span Δy (see FIG. 2). As the outer nut 9 is caused to rotate further, the spring washer 8, sandwiched between the inner nut 7 and the outer nut 9, narrows this span, which finally becomes a substantially same span as the thickness of the spring washer 8 (see FIG. 1). Elastic deformation of the spring washer 8 at this time comes to be reserved as an energy. Here, as understood from the above explanation, a dish spring washer having a similar function may be used in place of the spring washer 8.

Tightening Torque for the Inner Nut 7

When the outer nut 9 is caused to rotate, the spring washer 8 rotates via the seat, and the inner nut 7 is driven to rotate by rotation of the spring washer 8. That is, rotational torque provided by the outer nut 9 to the inner nut 7 is brought to the seat of the outer nut 9 on the spring washer 8 side and to the spring washer 8 in contact with the seat only with frictional force, and further rotational torque provided to the spring washer 8 is brought to the inner nut 7 via the inner seat of the spring washer 8 and the outer seat of the inner nut 7.

While the spring washer 8 is compressed (stored as an elastic energy) when the outer nut 9 is tightened with a torque T, a load W is created in a direction of the axial line of the outer nut 9 at this time. Here, with the dual threaded screw structure of this embodiment, "θ1 (inclination angle on the thread face of the outer nut 9 (inclination angle of the first thread))<θ2 (inclination angle on the thread face of the inner nut 7 (inclination angle of the second thread))". As the inner nut 7 is driven to rotate only with frictional force provided by rotation of the outer nut 9, the inner nut 7 does not rotate when decided torque has been attained even if the outer nut rotates. Consequently, when the inner nut 7 is tightened with a rotational torque T of the outer nut 9, it stops rotating after having rotated by a decided angle, so that the spring washer 8 between the inner nut 7 and the outer nut 9 comes to be compressed (in a state shown in FIG. 1). In such a manner, only by tightening the outer nut 9, also the inner nut 7 is tightened as well as compressed with compressing force W by the spring washer 8.

Axial Force Between the Inner Nut 7 and the Outer Nut 9 Due to the Outer Nut 9

When the outer nut 9 is caused to rotate against a load W in a direction of the axial line, the spring washer 8 is pressed to be compressed from Δy to the thickness t. The load W of the spring washer 8 comes to be an axial force between the inner nut 7 and the outer nut 9 and stored as an elastic energy. As the load W comes to be an axial force between the inner nut 7 and the outer nut 9 and also to be a force for locking both nuts only by tightening the outer nut 9, it is not necessary to conduct operation of tightening back of the inner nut 7 as in a case of ordinary fastening with double nuts. Further, loosening does not occur as in a case of reported fastening not with double nuts but fastening with a bolt using a spring washer (see Non-patent Document 1).

As understood from the above explanation, in the fastening structure 1 shown in FIG. 1, the above axial force F and load W are loaded only by tightening the outer nut 9 on the bolt 4 as a force in the direction of the axial line. Specifically, an axial force F is loaded on the body portion 6 and the axial force between the outer nut 9 and the inner nut 7 is "F+W" theoretically. Elastic deformation of the spring washer 8 is an elastic energy stored in the spring washer 8 as long as the inner nut 7 or the outer nut 9 does not move or rotate. As the load W of the spring washer 8 at this time does not decrease, probability of loosening between the outer nut 9 and the inner nut 7 becomes low.

Consequently, relation of the axial forces loaded on the bolt 4 of the fastening structure 1 of this disclosure becomes as follows.

F (axial force on the body portion 6)<F+W (axial force between the inner nut 7 and the outer nut 9)

As understood from the above explanation, holding an axial force "F" necessary for fixing the fastened member 2 that is required in design and holding an axial force "F+W" between the inner nut 7 and the outer nut 9, loosening never occurs with the fastening structure 1 of the present disclosure as long as the load thereon does not exceeds supposed one. That is, the axial force corresponds to such one as an axial force W between the inner nut 7 and the outer nut 9 added to an axial force F on the body portion 6 created by tightening of the outer nut 9. Further, the value of the load W is decided with a spring constant k of the spring washer 8.

EMBODIMENTS

For test pieces analogous to the above fastening structure 1, test for loosening of a screw was conducted by providing vibration, in a prerequisite of the above explained. Embodiments of this disclosure will be explained as tests of loosening below.

Experiment 1

[Condition of Test of Loosening]

(Specification of Test Pieces in Experiment 1)

For test pieces in Experiment 1, test of loosening was conducted for fastening structures, each with a bolt, nuts and a spring washer, of the following specifications shown in Table 1 with a testing machine of loosening.

TABLE 1

| Specifications of test pieces | |
|---|---|
| Items | Condition |
| dimension of bolt | first thread: M12 × P1.75 |
|  | second thread: two threads (1 thread extracted from three threads) × P2.625 |
|  | length from head L: 60mm (thread along whole thread) |
| material of bolt, manufacturing step | SCM435: heat treatment after rolling |
| strength range of bolt | 10.9 |
| surface treatment of bolt | none |
| dimension of nut with inner multi-thread | M12 × P2.625 × two threads H (thickness): 15 mm (single-chamferred) |
| dimension of nut with outer single-thread | M12 × P1.75 × single thread H (thickness): 15 mm (single-chamferred) |
| material of bolt | SCM435 |
| strength range of nut | 10T |
| surface treatment of nut | none |
| dimension of spring washer | nominal designation 12: inner diameter 12.2[mm] × outer diameter 21.5[mm] (No.2 (for common use)) |

TABLE 1-continued

Specifications of test pieces

| Items | Condition |
| --- | --- |
| dimension of dish spring washer | nominal designation 12: inner diameter 13.0[mm] × outer diameter 24.0[mm] (for light load of first kind: 1L) |

(Testing machine)

As shown in Table 2, a Junker testing machine J121 (made by Vibrationmaster Ltd. residing in Luxembourg City, France) corresponding to standards of ISO16130, DIN16130, DIN25201-4 and DIN65151 was used in the test of loosening. Condition for the test is as shown in the following Table 2.

TABLE 2

Testing machine, Condition of test

| Items | Condition |
| --- | --- |
| type of testing machine | Vibrationmaster J121 Fastener Test Bench |
| direction of excitation | direction perpendicular to axis of bolt (X-axis in FIG. 1) |
| axial force by effective initial load FM | 15 kN (constant axial force) |
| tightening torque for attainig F | 43-47 Nm |
| frequency f in test | 12.5 Hz |
| effective lateral displacement | 0.8 mm |
| length of tested portion (clamped length) | 27 mm |
| number of maximum load | 2,000 times |
| lubricant | molybdenum disulfide |
| temperature in test | room temperature (20° C.) |

(Procedure of Test)

Summary of test procedure with the above testing machine is as following (1) to (5).

(1) Lubricant (molybdenum disulfide) is painted onto bolts to be tested. Each of the bolts is set on the testing machine.

(2) A multi-threaded nut, a spring washer (SW) or dish spring washer and a single-threaded nut are screwed onto each of the bolts sequentially. Axial force of the bolt is managed by tightening the outer nut so as to be axial force of about 15.00 kN with an ordinary torque wrench (tightening torque was about 43 to 47 Nm).

(3) Starting vibration test (load in X axis direction (FIG. 1)), lateral movement of specific amplitude and frequency is provided on a jig for setting the test piece repeatedly and dynamic lateral load is loaded onto the fastening structure with bolt.

(4) Change of axial force is monitored during the test (up to completion of 2000 cycles).

(5) In a case where axial force has failed out completely or the bolt has been broken without completing preset 2000 cycles, the test is finished at the time.

[Result of Experiment 1]

The following Table 3 shows result of test of loosening of Experiment 1.

TABLE 3

Result of test of loosening

| | washer between nuts | | | | | |
| --- | --- | --- | --- | --- | --- | --- |
| | dish spring washer | | | spring washer | | |
| | axial force before test [kN] | remaining axial force [kN] after 2000 cycles | remaining axial force [%] | axial force before test [kN] | remaining axial force [kN] after 2000 cycles | remaining axial force [%] |
| first test | 15.61 | 14.55 | 93.2 | 15.36 | 14.04 | 91.4 |
| second test | 15.11 | 6.43 | 42.6 | 15.77 | 13.93 | 88.3 |
| third test | 15.15 | 14.67 | 96.8 | 15.71 | 14.71 | 93.6 |

[Experimental Result of Test of Loosening]

From the result of numerical values in the above Table 3, it has been clarified that axial force is held after 2,000 cycles.

(1) Remaining axial force (%) in a case where "a dish spring washer" is incorporated between nuts 42.6-96.8%

(2) Remaining axial force (%) in a case where "a spring washer" is incorporated between nuts 88.3-93.6%

From the above result, for the fastening structure with double nuts having dual-threaded screw of the embodiment of this disclosure, loosening does not easily occur with axial force of the bolt being of values within a decided range.

[Result of Experiment 1]

The following Table 4 shows result of test of axial force in Comparative Example 1 (shank and nut thereof are standardized ones), Comparative Example 2 and Embodiment. Bolts used in Comparative Example 1 were ones each having a metric coarse thread (M12) defined in JIS and two same kinds of standardized nuts were used for the two nuts. Bolts and nuts having specification shown in Table 1 are used as ones in Comparative Example 2. Each of bolts and nuts in the Embodiment were of the same specification as in Comparative Example 2 and is different from Comparative Example 2 (without a spring washer: SW) only in causing a spring washer (JIS No. 3) to intervene between the two nuts. As a condition of fastening before test, each of both nuts was tightened with 42 Nm in Comparative Example 1, and only the outer nut 9 was tightened with 42 Nm in Comparative Examples 2 and Embodiment. "Average value for 10 times" in Table 4 means each as a value averaged for values obtained in tests of 10 times.

TABLE 4

Result of comparative tests

| | axial force between nuts [kN] | | axial force [kN] | |
| --- | --- | --- | --- | --- |
| | average for 10 tests | maximum value | average for 10 tests | maximum value |
| Comparative Example 1 (bolt and nut defined in Standard) | 37.2 | 44.8 | 8.2 | 9.1 |

TABLE 4-continued

Result of comparative tests

|  | axial force between nuts [kN] | | axial force [kN] | |
|---|---|---|---|---|
|  | average for 10 tests | maximum value | average for 10 tests | maximum value |
| Comparative Example 2 (bolt and nut shown in Table 1, without SW) | 23.4 | 32.5 | 18.3 | 23.6 |
| Embodiment (bolt and nut shown in Table 1, with SW) | 19.2 | 41.8 | 17.2 | 21.3 |

[Experimental Result of Axial Force of Experiment 1]

As seen from the result of numerical values in the above Table 4, tightening torques in Comparative Example 1, Comparative Example 2 and Embodiment are of 42 Nm and, while axial force before experiment is of substantially same value, values of axial force after experiment are various respectively as follows.

(1) Axial Force Between Nuts (kN)
 Comparative Example 1 (37.3)>Embodiment (29.2) >Comparative Example 2 (23.4)

(2) Axial Force of Bolt (kN)
 Comparative Example 2 (18.3)>Embodiment (17.5) >Comparative Example (8.2)

From these results, while axial force (kN) between nuts of Comparative Example 1 (prior art) is high, its axial force of bolt is low. While axial force of bolt of Comparative Example 2 (without SW) is high, its axial force between nuts is low. With the Embodiment of this disclosure, values of axial force between nuts and axial force of bolt are within a decided range, providing excellent balance as a fastening structure, so that loosening therein does not easily occur.

Experiment 2

[Experiment of Change of Axial Force Over Time Under Load]

In the next, change of axial force over time was measured when vibrational load is loaded on a fastening structure with double nuts having dual-threaded screw with a testing machine of loosening, in Experiment 2.

(Specification of Test Pieces in Experiment 2)

Test pieces in Experiment 2 are fastening structures, each with bolts, nuts and spring washers, having specification as shown in the following Table 5, and loosening test was conducted with testing machine of loosening similar as one used in Experiment 1. Fastening structures substantially same except in that length (L) of bolts are different were used.

TABLE 5

Specifications of test pieces

| Items | Condition |
|---|---|
| dimension of bolt | first thread: M12 × P1.75 second thread: two threads (1 thread extracted from three threads) × P2.625 length from head L: 80 mm (thread along half length) |
| material of bolt, manufacturing step | SCM435: heat treatment after rolling |
| strength range of bolt | 10.9 |
| surface treatment of bolt | none |

TABLE 5-continued

Specifications of test pieces

| Items | Condition |
|---|---|
| dimension of nut with inner multi-thread | M12 × P2.625 × two threads H (thickness): 10 mm (single-chamferred) |
| dimension of nut with outer single-thread | M12 × P1.75 × single threads H (thickness): 15 mm (single-chamferred) |
| material of bolt | SCM435 |
| strength range of nut | 10T |
| surface treatment of nut | none |
| dimension of spring washer | nominal designation 12: inner diameter 12.2[mm] × outer diameter 21.5[mm] (No.2 (for common use)) |
| dimension of dish spring washer | nominal designation 12: inner diameter 13.0[mm] × outer diameter 24.0[mm] (for light load of first kind: 1L) |

The testing machine and condition in the test was as shown in the following Table 6.

TABLE 6

Testing machine, Condition of test

| Items | Condition |
|---|---|
| type of testing machine | Vibrationmaster J121 Fastener Test Bench |
| direction of excitation | direction perpendicular to axis of bolt (X-axis in FIG. 1) |
| axial force by effective initial load FM | 20 kN |
| tightening torque for attainig F | 30-47 Nm |
| frequency f in thest | 12.5 Hz |
| effective lateral displacement | 0.8 mm |
| length of tested portion (clamped length) | 27 mm |
| number of maximum load | 200 times/16 sec |
| lubricant | molybdenum disulfide |
| temperature in test | room temperature (20° C.) |

Procedures of loading test are generally same as the above procedures. The following Table 7 shows results of test of loosening, data showing change of axial force over time when vibrational load of 200 (times/16 sec.) is loaded onto a dish spring washer, a spring washer (SW for right-hand thread) and a spring washer (SW for left-hand thread) respectively. The experimental data are ones obtained by repeating similar tests three times for each of same test pieces. There was not large difference in axial force thereof.

TABLE 7

Result of test of loosening

| | washer between nuts | | | | | |
|---|---|---|---|---|---|---|
| | dish spring washer | | spring washer (for right-hand thread) | | spring washer (for left-hand thread) | |
| | axial force before test [kN] | remaining axial force [kN] after 200 cycle test | axial force before test [kN] | axial force after same test [kN] | axial force before test [kN] | axial force after same test [kN] |
| first test | 20.00 | 20.19 | 20.00 | 20.74 | 20.00 | 20.12 |
| second test | 20.00 | 20.01 | 20.00 | 20.66 | 20.00 | 22.19 |
| third test | 20.00 | 19.99 | 20.00 | 21.56 | 20.00 | 23.41 |

Figure 3A:
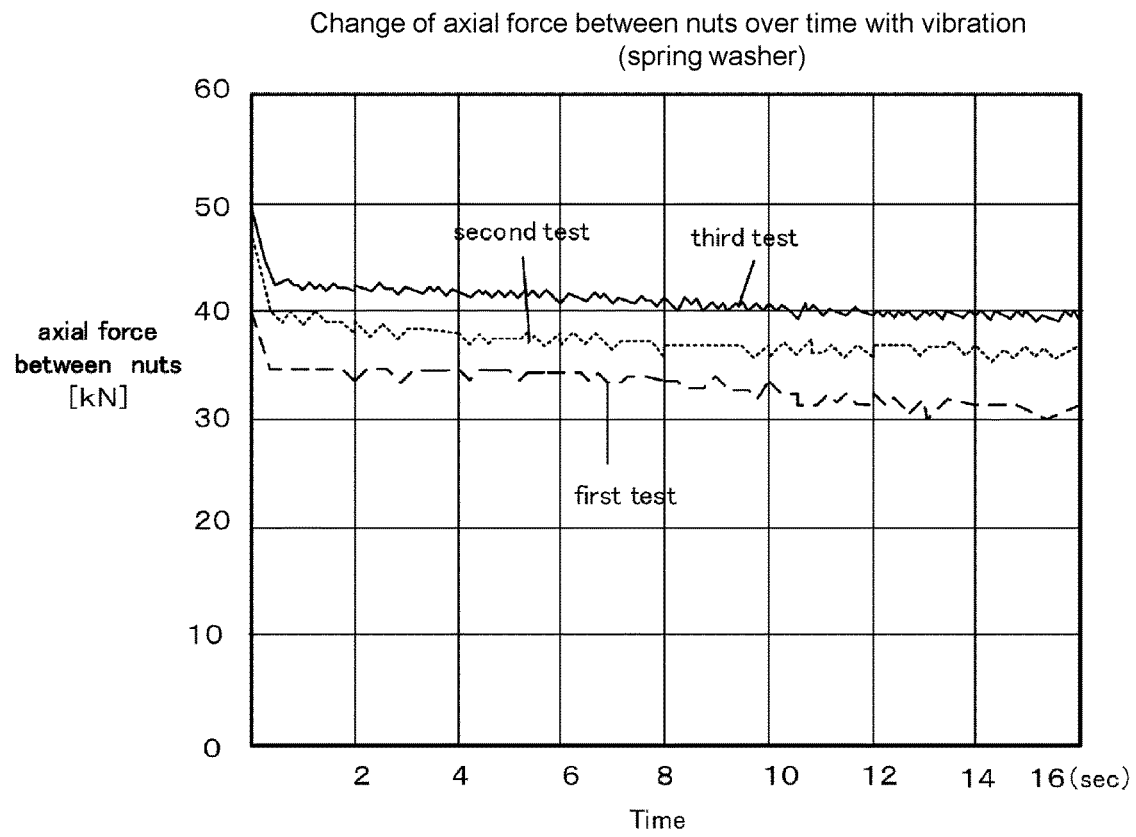
Figure 3B:
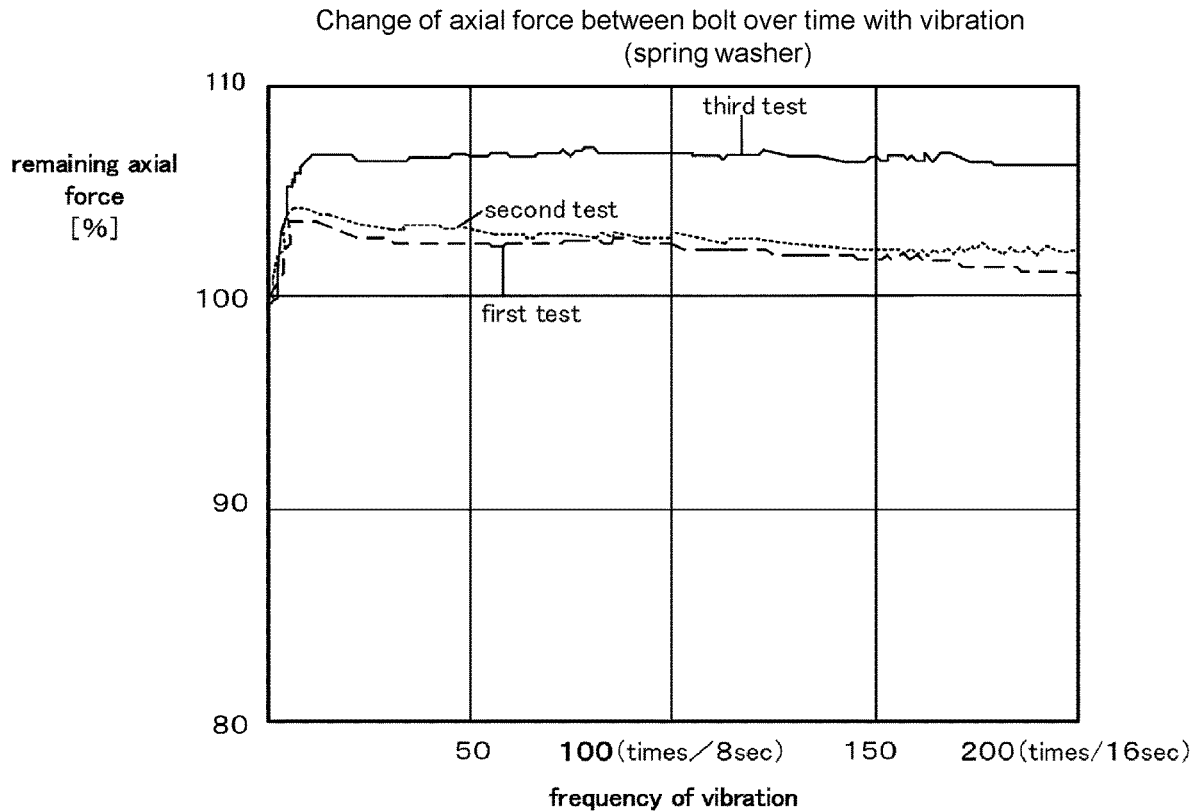
Figure 4A:
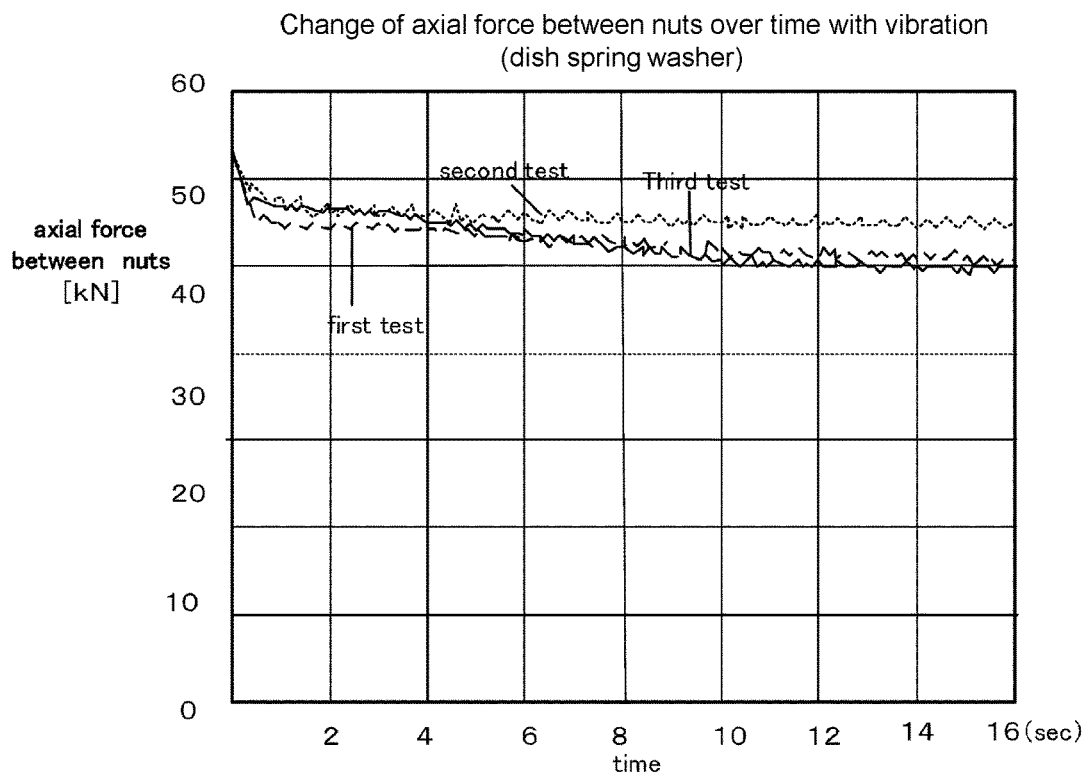
Figure 4B:
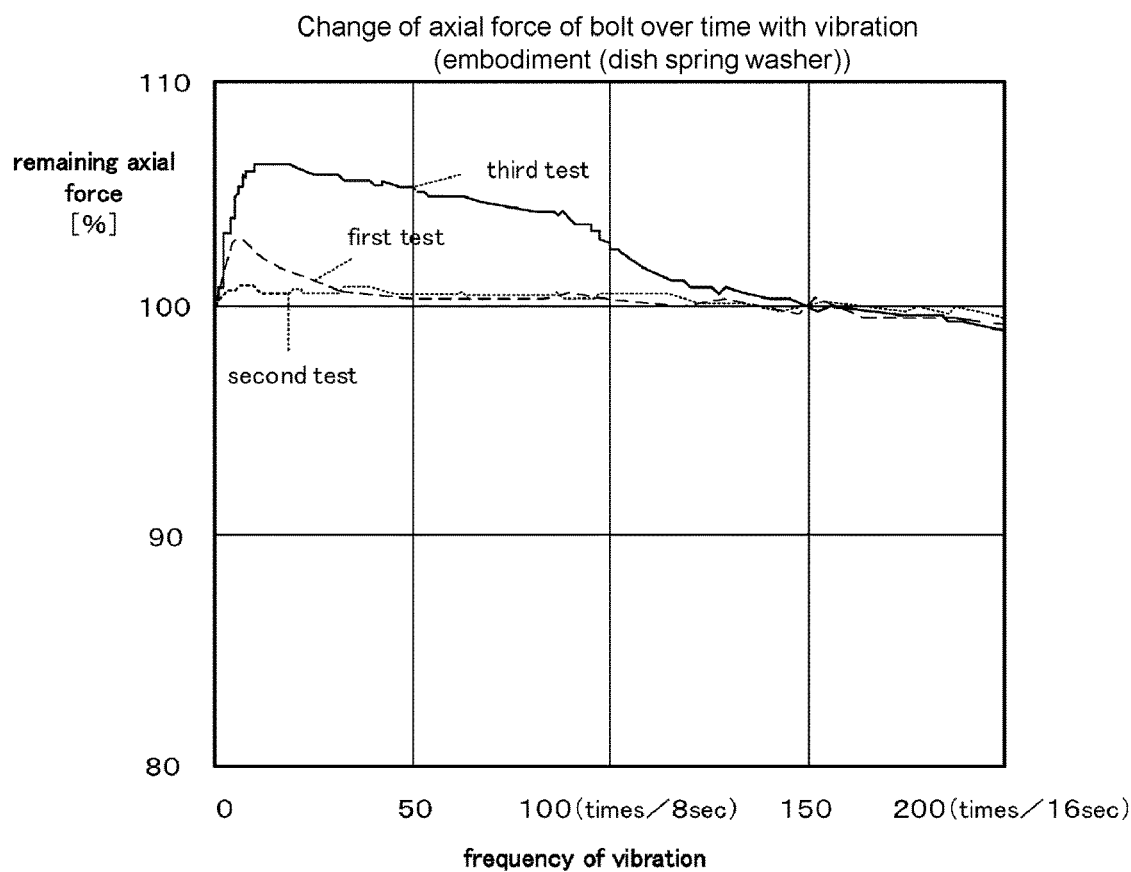
Figure 5A:
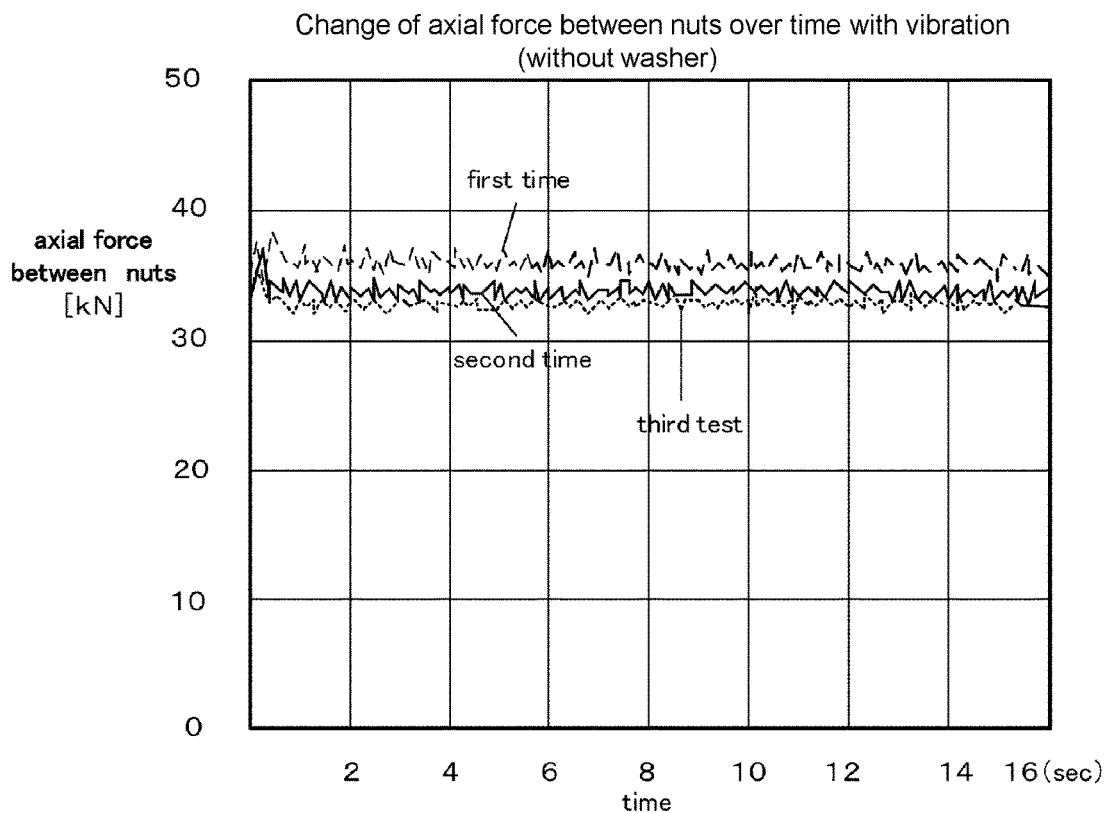
Figure 5B:
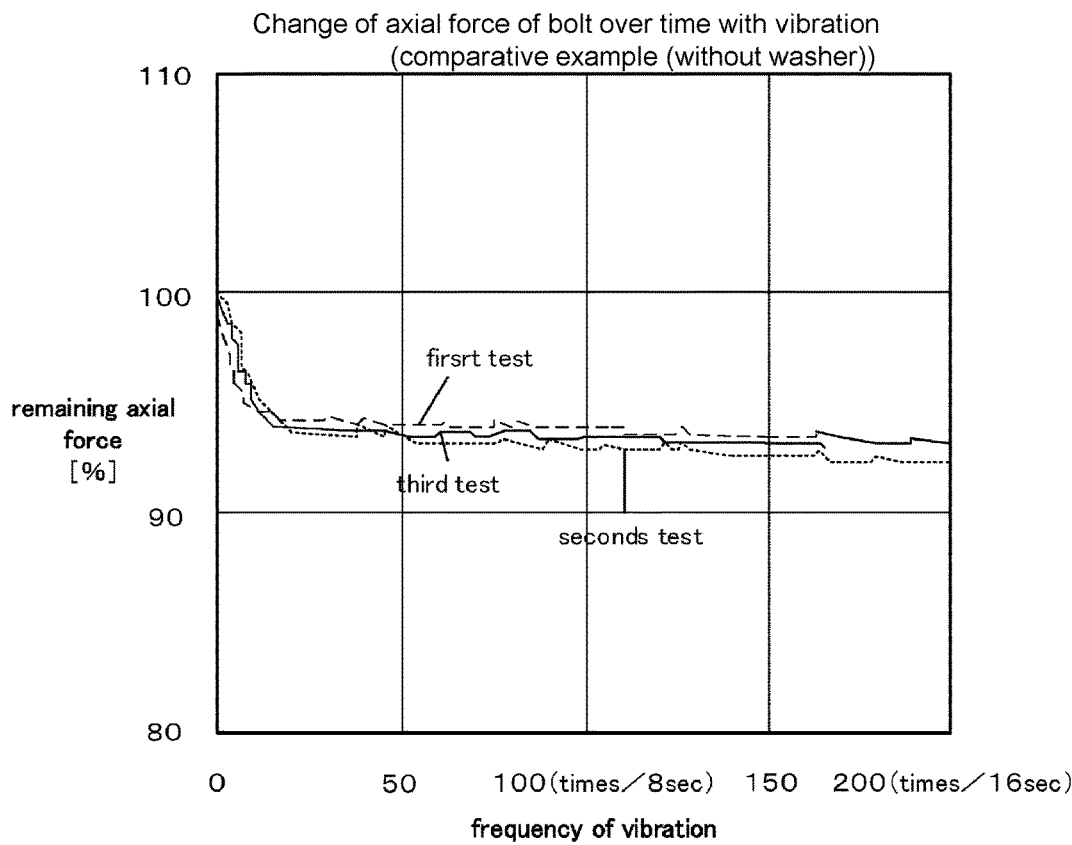

FIGS. 3A to FIG. 5B are views showing change of axial force over time when vibrational load of 200 (times/16 sec.) is loaded. FIG. 3A and FIG. 3B show data of a spring washer (for right-hand thread), FIG. 4A and FIG. 4B show data of a dish spring washer and FIG. 5A and FIG. 5B show data without a spring washer respectively. In detail, FIG. 3A and FIG. 3B are obtained by measuring change of axial force over time in a case where a spring washer (SW) is sandwiched between nuts in a fastening structure with double nuts having dual-threaded screw, in which FIG. 3A shows change of axial force over time of a shank between nuts, and FIG. 3B shows change of axial force over time of a shank in a fastened part. While axial force between nuts decreases as time lapses as can be understood from data shown in FIG. 3A, axial force of a shank of a fastened part increases at an early stage of vibrational load as shown in FIG. 3B. This means that axial force between nuts is larger than axial force of a fastened part of a shank of a fastened part due to a spring washer in a fastened state. Torque coefficient of the inner nut 7 (a second nut) becomes smaller than the outer nut 9 (a first nut) as a lead angle of the former is larger than the latter. Consequently, when vibrational load is loaded, the inner nut 7 (a second nut) rotates or moves until it attains a stable position so that axial force between both nuts is lowered and, on the other hand, axial force of the fastened part becomes increases.

These data show that a fastening structure with double nuts having dual-threaded screw is not easily loosened even if vibrational load is loaded. Here, data in FIG. 3A, FIG. 3B, FIG. 4A and FIG. 4B are ones in a case where a fastened part is fastened with axial force thereof being 20 kN by causing only the outer nut 9 (first nut) to rotate. FIG. 4A and FIG. 4B show change of axial force over time in a fastening structure with double nuts having dual-threaded screw measured when a dish spring washer is sandwiched between nuts, wherein FIG. 4A shows change of axial force between nuts over time and FIG. 5B shows change of axial force of a fastened part over time. In a similar manner as data of a spring washer shown in FIG. 3A and FIG. 3B, while axial force between nuts decreases as can be understood from data shown in FIG. 4A, axial force of a shank of a fastened part increases at an early stage of vibrational load as shown in FIG. 4B.

FIG. 5A and FIG. 5B show, for Comparative Example, measured change of axial force over time without a spring washer, etc., between nuts in a conventional fastening structure defined by Standard, wherein FIG. 5A shows change of axial force between nuts over time and FIG. 5B shows change of axial force of a fastened part over time. Here, for the conventional fastening structure with double nuts having dual-threaded screw, fastening art is different from one shown in FIG. 3A, FIG. 3B, FIG. 4A and FIG. 4B in that both of the inner nut and outer nut are tightened with a same torque. In a case of the conventional fastening structure with double nuts having dual-threaded screw defined by Standard, axial force of the fastened part decreases even at an early stage of vibrational load.

APPLICABILITY IN INDUSTRY

The fastening structure with double nuts having dual-threaded screw of this disclosure can be used in bridges of railways, roads, etc., various moving machines, industrial machines, etc., and is specifically optimum as a fastening structure for parts subjected to vibration.

What is claimed is:

1. A fastening structure with double nuts having dual-threaded screw, comprising:
    a dual-threaded screw structure having two kinds of threads formed on a shank thereof, said two kinds of threads including:
        a first one-threaded selected from metric thread, Whitworth thread, unified thread, trapezoidal thread, pipe thread, round thread, ball thread and square thread, and
        a second one-threaded or multi-threaded thread formed in a same twisting direction as the first one-thread and having a lead (Ln) larger than a pitch (P) of the first one-thread;
    a first nut screwed onto the first one-thread; and
    a second nut screwed onto the second one-thread on a side of a fastened member and at an inside position of the first nut;
    wherein a spring-shaped washer being elastically deformable is provided between the first nut and the second nut to be fitted into the dual-threaded screw structure.

2. The fastening structure with double nuts having dual-threaded screw according to claim 1, wherein
    the spring-shaped washer is a spring washer.

3. The fastening structure with double nuts having dual-threaded screw according to claim 1, wherein
    the spring-shaped washer is a dish spring washer.

4. The fastening structure with double nuts having dual-threaded screw according to claim 1, wherein
    the lead (Ln) of the second one-thread (S2) is an integer number n times of the pitch (P) of the first one-thread (S1).

5. The fastening structure with double nuts having dual-threaded screw according to claim 1, wherein
    an axial force on the side of the fastened member increases at an early stage of vibrational load, so that the fastening structure becomes not to be easily loosened.

* * * * *